United States Patent [19]

Butcher

[11] 4,219,213
[45] Aug. 26, 1980

[54] SPARE WHEEL APPARATUS

[76] Inventor: Duane E. Butcher, Box 42, Absarokee, Mont. 59001

[21] Appl. No.: 954,939

[22] Filed: Oct. 26, 1978

[51] Int. Cl.² .............................................. B60S 9/04
[52] U.S. Cl. ................. 280/475; 224/42.21; 280/82; 414/466
[58] Field of Search .............. 224/42.21, 42.24, 42.25, 224/42.12, 273; 414/463, 466; 280/83, 84, 414 R, 475, 82, 150.5

[56] References Cited
U.S. PATENT DOCUMENTS

| 2,926,930 | 3/1960 | Pease | 280/475 |
|---|---|---|---|
| 3,348,860 | 10/1967 | Buckles | 280/475 |
| 3,348,861 | 10/1967 | Curtis et al. | 280/475 |
| 3,869,149 | 3/1975 | Dixon | 280/475 |

Primary Examiner—Robert J. Spar
Assistant Examiner—Jerold M. Forsberg
Attorney, Agent, or Firm—Arthur L. Urban

[57] ABSTRACT

Apparatus for mounting a spare wheel on a tongue of a trailer including a wheel supporting hub, a first shaft extending from the rear of the wheel supporting hub, the shaft being rotatably carried within a first shaft supporting sleeve, a retainer for retaining the first shaft within the first sleeve, an arm extending from the first sleeve substantially perpendicular to the axis of the first shaft disposed within the first sleeve, the end of the arm remote from the first sleeve being affixed to one end of a second shaft, the second shaft being disposed substantially parallel to the first shaft and extending from the arm in a direction opposite to that from which the wheel supporting hub extends from the first shaft, the second shaft being rotatably carried by a second sleeve, biasing means associated with the second shaft urging the arm toward the second sleeve, locking devices for fixing the arm with respect to the adjacent second sleeve in more than one position, and a mounting assembly associated with the second sleeve for securing the apparatus to the trailer tongue.

4 Claims, 4 Drawing Figures

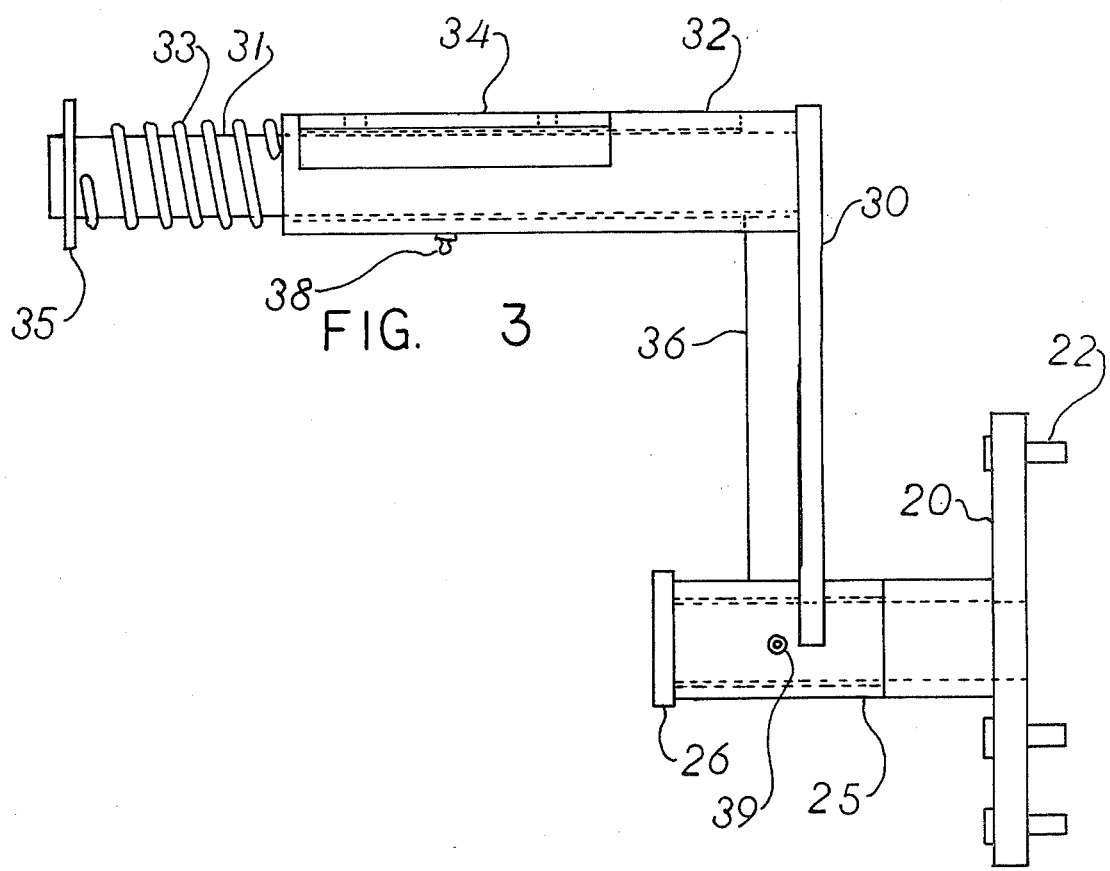
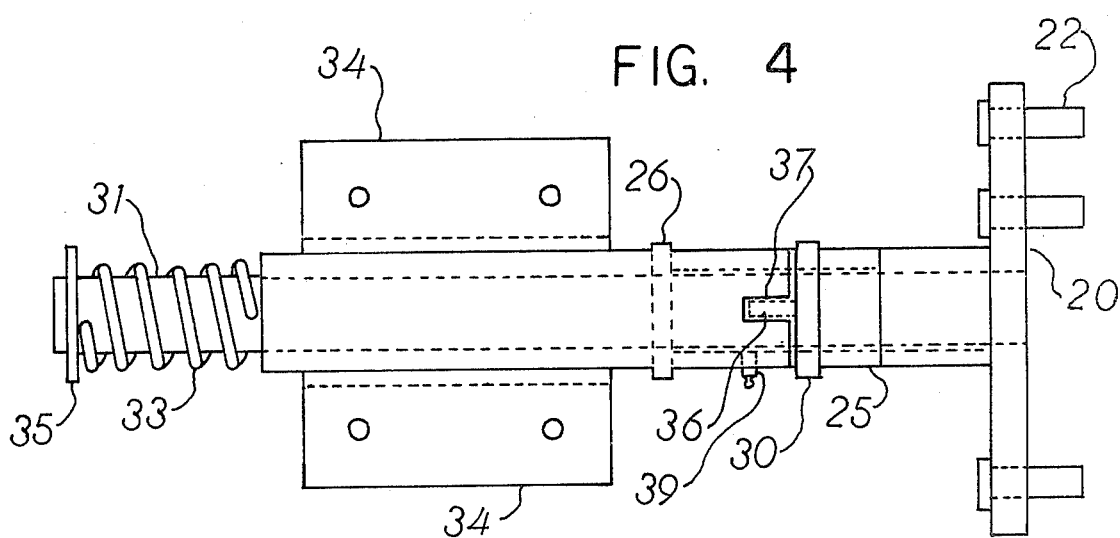

SPARE WHEEL APPARATUS

This invention relates to a novel apparatus for mounting a spare wheel on a trailer and more particularly relates to a new apparatus for mounting a spare wheel on a trailer tongue.

One of the problems in the use of trailers is the difficulty in maneuvering them. Maneuvering of a trailer may be required when the trailer is parked, when it is being coupled to a vehicle and when the trailer is being moved by the vehicle.

Although some trailers have axles and wheels arranged to provide independent maneuverability, most trailers have their axles and wheels arranged for support of their load rather than for maneuverability. Such designs rely on attachment to a vehicle for maneuverability. Commonly, trailers have a tongue extending from the front thereof which is attached to the rear of a vehicle through a separating hitch.

The attachment of the trailer to the vehicle in effect transfers a portion of trailer weight to the vehicle and utilizes the rear vehicle axles and wheels to assist in the support and maneuverability of the trailer. Even when the trailer has more than one axle because of the heavy weight of the trailer and load, the multiple axles generally are located together toward the rear of the trailer. This is done to distribute a significant portion of the weight of the trailer to the hitch of the vehicle so the trailer will track properly (not sway) when the trailer is being towed along a highway.

While attachment to the vehicle improves the maneuverability of the trailer, when the trailer is uncoupled, the maneuverability is lost again. When the trailer is separated from the vehicle, the weight on the trailer tongue causes it to drop to the ground. If it is necessary to move the trailer, the tongue must be raised off the ground and maneuver the trailer on its rear wheels. Although this may be satisfactory for light weight trailers and loads, it is not suitable for most trailers and loads.

With larger trailers and loads, it is common to install a small wheel on the tongue adjacent the hitch. The bracket connecting the wheel with the tongue may include a jack section so the wheel can be raised when not in use such as when the trailer is coupled to a vehicle.

Although such small tongue mounted wheels improve the maneuverability of trailers to a degree, they are not acceptable in many situations. For example, if the trailer and load are heavy, the small wheel will not support the load. Also, if the ground under the trailer is not firm, the wheel will sink into the ground to hinder movement of the trailer. This can be particularly troublesome with a boat trailer which is backed into the water for launching or reloading of a boat.

The present invention provides a novel apparatus which improves the maneuverability of a trailer. This improvement is attained whether the trailer is attached to a vehicle or being coupled thereto or even if the trailer is separated from the vehicle. The apparatus of the invention provides a large support surface for a trailer tongue and thus provides improved maneuverability of the trailers with heavy loads even on soft ground.

The apparatus of the invention can be installed on a trailer easily without special skills or tools. Furthermore, the apparatus is convenient to use with a minimum of instruction. Also, the apparatus of the invention is simple in design with good durability even under hard use. Moreover, the apparatus can be fabricated from commercially available components and materials relatively inexpensively.

Other benefits and advantages of the novel apparatus of the present invention will be apparent from the following description and the accompanying drawings in which:

FIG. 3 is a left end view of the apparatus of the invention shown in FIG. 1; and FIG. 4 is a top view of the apparatus of the invention shown in FIG. 1.

Figure 1:
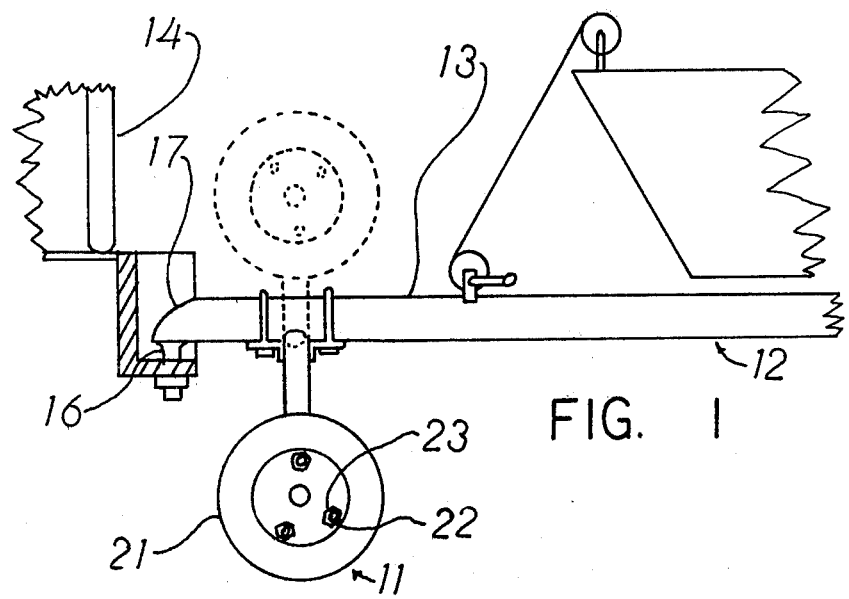
FIG. 1 is a side elevation of one form of the apparatus of the invention installed on a trailer.
Figure 2:
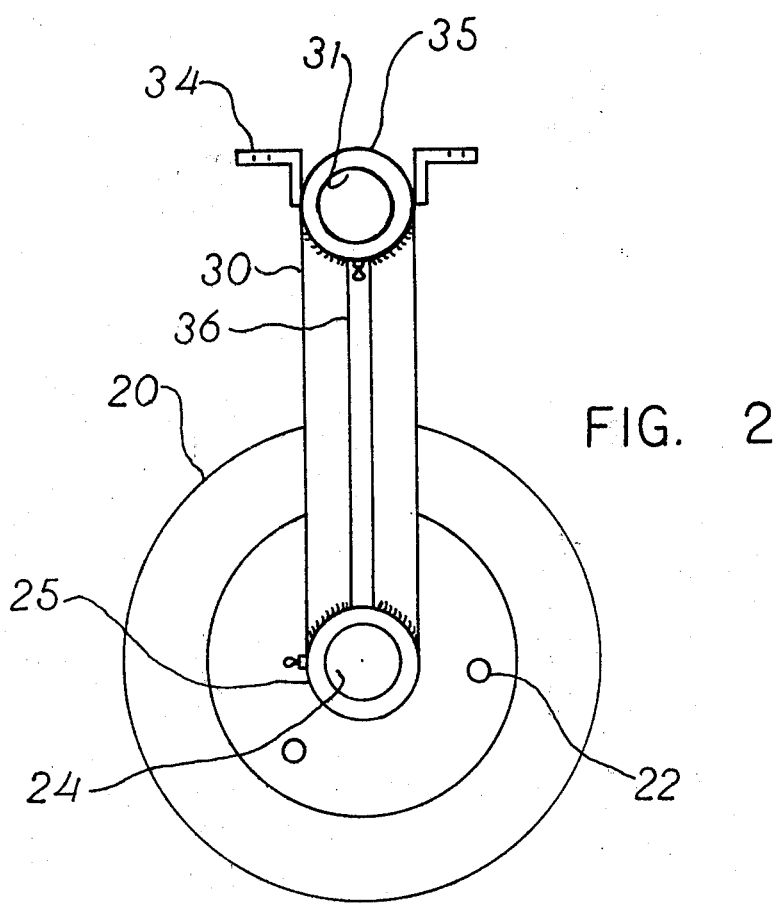
FIG. 2 is an enlarged view from the rear of the apparatus of the invention shown in FIG. 1.

As shown in the drawings, one form of the apparatus 11 of the invention is installed on a trailer 12. Trailer 12 has a tongue 13 extending from the front thereof. The end of tongue 13 is connected to the rear of a vehicle 14 through a separating hitch which has one portion 16 affixed to the vehicle and another portion 17 secured to the tongue.

Apparatus 11 of the invention includes a wheel supporting hub 20 with a wheel 21 secured thereto by fastening means shown as lugs 22 and nuts 23. A first shaft 24 which extends from the rear of hub 20 is rotatably carried within a shaft supporting sleeve 25. Shaft 24 is retained within sleeve 25 by a collar 26 or other fastening means secured to the free end of the shaft.

Arm 30 extends from sleeve 25 substantially perpendicularly to the axis of shaft 24 which is carried by the sleeve. As shown, one end of arm 30 is welded to sleeve 25. The opposite end of arm 30 which is remote from sleeve 25 is affixed to one end of a second shaft 31. Second shaft 31 is disposed substantially parallel to the first shaft 24 and extends from arm 30 in a direction opposite to that from which wheel supporting hub 20 extends from first shaft 24.

Second shaft 31 is rotatably carried by a second sleeve 32. Biasing means are associated with second shaft 31 urging the arm 30 toward the second sleeve 32. As shown, a coil spring 33 is positioned over a free portion of shaft 31 extending beyond sleeve 32. A collar 35 is secured to the end of shaft 31 to maintain the spring 33 in place. To facilitate mounting of the apparatus of the invention on trailer tongue 13, mounting means are associated with sleeve 32. The mounting means advantageously may be one or more flange sections 34 extending outwardly from sleeve 32.

Locking means fix the position of arm 30 with respect to sleeve 32. The locking means advantageously includes indexing means to fix the arm in more than one position. The locking means preferably includes a perpendicular section 36 which is engageable with a slot or slots 37 formed in the end of sleeve 32 adjacent to the arm. Perpendicular section 36 may extend along substantially the entire length of arm 30 to increase the rigidity thereof if desired. Sleeves 25 and 32 may include lubricating means such as grease fittings 38 and 39 along their lengths.

In the operation of the novel apparatus of the invention as shown in the drawings, the apparatus 11 is installed on the tongue 13 of trailer 12. This is accomplished by any of a number of known fastening techniques including welding or bolting flange sections 34 to the tongue. Also, the spacing between the openings in flange sections may selected to allow U-bolts to encircle the tongue and pass through the openings with bolts affixed to the ends thereof. The height of the apparatus is advantageously selected so the tongue will properly aligned with the hitch portion of the vehicle.

A spare wheel 21 is mounted on supporting hub 20 by positioning the openings in the wheel rim over the lugs 22 of the hub and tightening nuts 23 on the lugs. The apparatus then is positioned so the wheel 21 extends downwardly from tongue 13. This is accomplished by pulling arm 30 away from sleeve 32 and slots 37 therein against the force of coil spring 33. Withdrawing perpendicular section 36 from slots 37 allows arm 30 and wheel 21 affixed to hub 20 to rotate to the downward position. Releasing the pull on arm 30 permits perpendicular section 36 to engage the slots 37 in sleeve 32 by the force of spring 33 and locks the apparatus. In this position, the weight of trailer 12 rests on wheel 21 and the rear wheels of the trailer (not shown) and allows the trailer to be maneuvered into a desired position.

When the trailer has been coupled to a vehicle and is ready to be towed over a highway, the apparatus can be manipulated to raise the wheel 21 off the ground. This is accomplished in the manner described above for lowering the wheel. Arm 30 is pulled from sleeve 32 to release section 36 from slots 37 so the apparatus can be rotated to the desired position.

Upon arrival at the desired camping or boat launching site, where perhaps the ground is soft, the wheel 21 can be lowered as described above to relieve some of the trailer weight from the vehicle and transfer it to the wheel. This enables the trailer to be maneuvered into a desired position more easily and with less risk of getting stuck. The apparatus also facilitates removal of the trailer.

The above description and the accompanying drawings show that the present invention provides a novel apparatus for mounting a spare wheel on a tongue of a trailer. The apparatus of the invention not only provides a novel storage facility for a spare wheel, but also provides a unique structure for using the wheel to facilitate maneuvering of the trailer. This improvement in maneuverability is produced whether the trailer is attached to a vehicle, in the process of being coupled or is separated from the vehicle.

The design of the apparatus of the present invention provides a large support surface for a trailer tongue which facilitates maneuvering of the trailer with heavy loads even on soft ground. Furthermore, the unique design of the apparatus makes it convenient to use with only a minimum of instruction. Also, the apparatus can be installed on a trailer without special tools or skills. In addition, the apparatus of the invention is simple in design and possesses good durability even under hard useage. Moreover, the apparatus can be fabricated from commercially available materials and components relatively inexpensively.

It will be apparent that various modifications can be made in the particular apparatus described in detail above and shown in the drawings within the scope of the invention. For example, the size and configuration of the components can be changed to meet specific requirements. Also, the mounting of the apparatus on the trailer tongue can be adapted for particular designs. Therefore, the scope of the invention is to be limited only by the following claims.

What is claimed is:

1. Apparatus for mounting a spare wheel on a trailer tongue including a wheel supporting hub, a first shaft extending from the rear of said wheel supporting hub, said shaft being rotatably carried within a first shaft supporting sleeve, means for retaining said first shaft with said first sleeve, an arm extending from said sleeve substantially perpendicularly to the axis of said first shaft disposed within said first sleeve, the end of said arm remote from said first sleeve being affixed to one end of a second shaft, said second shaft being disposed substantially parallel to said first shaft and extending from said arm in a direction opposite to that from which said wheel supporting hub extends from said first shaft, a second sleeve disposed about said second shaft, biasing means associated with said second shaft urging said arm toward said second sleeve, said biasing means including coil spring means positioned over the end of said second shaft remote from said arm, locking means for fixing said arm with respect to said adjacent second sleeve in more than one position, and means associated with said second sleeve for securing said apparatus to said trailer tongue; said arm including a section substantially perpendicular to said wheel supporting hub, said perpendicular section being aligned with and extending between said first and second shaft sleeves, said perpendicular section being engageable with slots in said second sleeve to lock said arm selectively in an up or down position with respect to said second sleeve, said arm and said perpendicular section providing a rigid, strong connection of a T-section between said first and second sleeve, whereby said spare wheel is capable of functioning as an extra wheel for said trailer.

2. Apparatus according to claim 1 wherein said wheel supporting hub includes fastening means for securing a wheel thereto including a plurality of lugs.

3. Apparatus according to claim 1 wherein at least one of said sleeves includes means for lubricating said shafts.

4. Apparatus according to claim 1 wherein said means for securing said apparatus to said trailer tongue includes flange sections extending outwardly from said second sleeve.

* * * * *